United States Patent
Davis, III et al.

(10) Patent No.: US 10,742,653 B2
(45) Date of Patent: Aug. 11, 2020

(54) AUTOMATED INDIVIDUALIZED NETWORK SECURITY CONTROLS FOR INTERNET OF THINGS (IOT) DEVICES

(71) Applicant: International Business Machines Corporation, Armonk, NY (US)

(72) Inventors: Charles K. Davis, III, Denver, CO (US); Chris Dotson, Lexington, KY (US); Steven Lingafelt, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 15/934,928

(22) Filed: Mar. 23, 2018

(65) Prior Publication Data
US 2019/0297078 A1   Sep. 26, 2019

(51) Int. Cl.
*H04L 29/06* (2006.01)

(52) U.S. Cl.
CPC ...... *H04L 63/0884* (2013.01); *H04L 63/0876* (2013.01); *H04L 63/205* (2013.01)

(58) Field of Classification Search
CPC ............. H04L 63/0884; H04L 63/0876; H04L 63/205
See application file for complete search history.

(56) References Cited

U.S. PATENT DOCUMENTS

| | | |
|---|---|---|
| 2015/0195126 A1 | 7/2015 | Vasseur et al. |
| 2016/0212099 A1 | 7/2016 | Zou et al. |
| 2016/0261465 A1 | 9/2016 | Gupta et al. |
| 2016/0352766 A1 | 12/2016 | Flacher et al. |
| 2017/0006454 A1 | 1/2017 | Salkintzis |
| 2017/0039501 A1 | 2/2017 | Deguchi |
| 2017/0171778 A1 | 6/2017 | Britt et al. |
| 2017/0342741 A1 | 11/2017 | Holland et al. |
| 2018/0007058 A1* | 1/2018 | Zou ..................... H04L 63/0263 |
| 2018/0139090 A1* | 5/2018 | Geiger ..................... G06F 21/44 |
| 2018/0152443 A1* | 5/2018 | Henrique Minatel ...................... H04W 76/10 |
| 2018/0191674 A1* | 7/2018 | Whittle ............... H04L 63/0227 |
| 2018/0212768 A1* | 7/2018 | Kawashima .......... H04L 9/3268 |

(Continued)

*Primary Examiner* — Jeffrey C Pwu
*Assistant Examiner* — William A Corum, Jr.
(74) *Attorney, Agent, or Firm* — Jeffrey S. LaBaw; David H. Judson

(57) ABSTRACT

A method, apparatus and computer program product for protecting enterprise Information Technology (IT) infrastructures by automatically instantiating individualized network flow controls and/or network access controls specific to an IoT device. In this approach, an IoT device is identified, e.g., via network scanning or other observational sensors, or by receipt of information from a network administrator. In response to receiving information about the new IoT device, a control component obtains applicable network flow control and/or access control rules for the IoT device. These rules are obtained from one or more authoritative (trusted) sources, e.g., querying a website of the IoT vendor, an industry site, or an enterprise site. In this manner, applicable network flow control and/or access control rules are obtained. The control component then translates those rules into configuration parameters that are consumable by the particular network flow control device that is (or will be) associated with the IoT device.

16 Claims, 4 Drawing Sheets

(56) References Cited

U.S. PATENT DOCUMENTS

| | | | |
|---|---|---|---|
| 2019/0026710 A1* | 1/2019 | Chow | H04L 67/2838 |
| 2019/0158355 A1* | 5/2019 | Ramisetty | H04L 41/0806 |
| 2019/0190737 A1* | 6/2019 | Kim | H04L 12/282 |
| 2019/0213064 A1* | 7/2019 | Baier | G06F 9/44557 |

* cited by examiner

AUTOMATED INDIVIDUALIZED NETWORK SECURITY CONTROLS FOR INTERNET OF THINGS (IOT) DEVICES

BACKGROUND

Technical Field

This disclosure relates generally to information processing and, in particular, to managing an Internet of Things (IoT) device.

Background of the Related Art

IoT is the network of physical objects embedded with electronics, sensors, software, and connectivity to enable the exchange of data with other connected devices over a data communication infrastructure according to a standard or specification. It is contemplated within IoT that devices such as refrigerators, thermostats, lighting appliances, vending machines, access-control devices, peripherals, a variety of mobile devices, and many other devices in everyday use (collectively referred to hereinafter as "device" or "IoT device"), will be able to communicate and interoperate with each other using such an infrastructure.

IoT devices are placed within networks, frequently without the network operator's knowledge, and also without network security controls that would limit the IoT device's bad behavior on the network. As a result, IoT devices are now commonly infected with malware, are used by hackers to gain access to a network and other devices on the network, and are used to attack other systems.

IoTs are typically unmanaged, which prevents an enterprise in which those devices operate from ensuring that the devices are not infected with malware, are not under hacker control, or are not attacking other systems. Typically, IoT devices are connected to the network by people with no knowledge of IT security and who are unaware that their actions are potentially dangerous to the enterprise. A further complication is that IoT devices are typically not registered as to their location and identity, and this prevents network operators from physically tracking down and removing problematic devices.

Yet another problem is that IoT devices exhibit many different types of behavior, and therefore generic or blanket network flow control rules are not effective in protecting the enterprise.

There remains a need to provide techniques to address these security concerns and, in particular, to implement a solution to protect enterprise IT infrastructures in which these types of devices are now becoming ubiquitous.

BRIEF SUMMARY

The subject matter herein describes a method, apparatus and computer program product for protecting enterprise IT infrastructures by automatically instantiating individualized network flow controls and/or network access controls specific to an IoT device. According to this disclosure, when a network control system becomes aware of a new IoT device, the control system queries an authoritative rule source to identify the network flow control and/or access control rules for the device, which it then implements.

Preferably, the basic operations are carried out within or in association with a control component for a set of one or more network flow control devices (e.g., routers, gateways, etc.) in the enterprise. In one embodiment, an IoT device is identified, e.g., via network scanning or other observational sensors that detect a new IoT device on the network (or some identifiable portion thereof), or by receipt of information from a network administrator or the like that the device has been installed. In response to receiving information about the new IoT device, the control component obtains applicable network flow control and/or access control rules for the IoT device. These rules are obtained in one of several ways, e.g., querying a website of the IoT vendor (or other supplier), querying an industry site that manages such information on behalf of IoT vendors, querying some other authoritative data source (e.g., an enterprise site) at which the information is or may be available, or the like. These sources are sometimes referred to herein generally as "authoritative" sources because they are trusted to provide network security and/or access control(s) for the IoT device. In this manner, applicable network flow control rules and/or access control rules are obtained. The control component then translates those rules into a set of one or more configuration parameters that are consumable by the particular network flow control device that is (or will be) associated with the IoT device. In particular, preferably the configuration parameters comprise an individualized "configuration" for the IoT device, namely, one that is customized for the IoT device based in part on the identity and location (within the network) of the IoT device, but typically also based on the manner in which the device is implemented within the larger enterprise network. In this manner, the particular configuration is customized for the IoT device. The control component then instantiates the configuration into the enterprise's network flow control device that is responsible for communications to and from the IoT device. Thereafter, the network flow control device monitors communications to and from the IoT device against the configuration (namely, the network flow control and/or access control rules as instantiated in the configuration), and it can then act as necessary to protect the enterprise IT infrastructure. For example, the network control device then takes one or more configured or predefined action(s) (e.g., issuing a notification or alert, blocking access to the network, etc.) when it determines, based on comparing monitored flows with the configuration, that the IoT device is or may be compromised.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
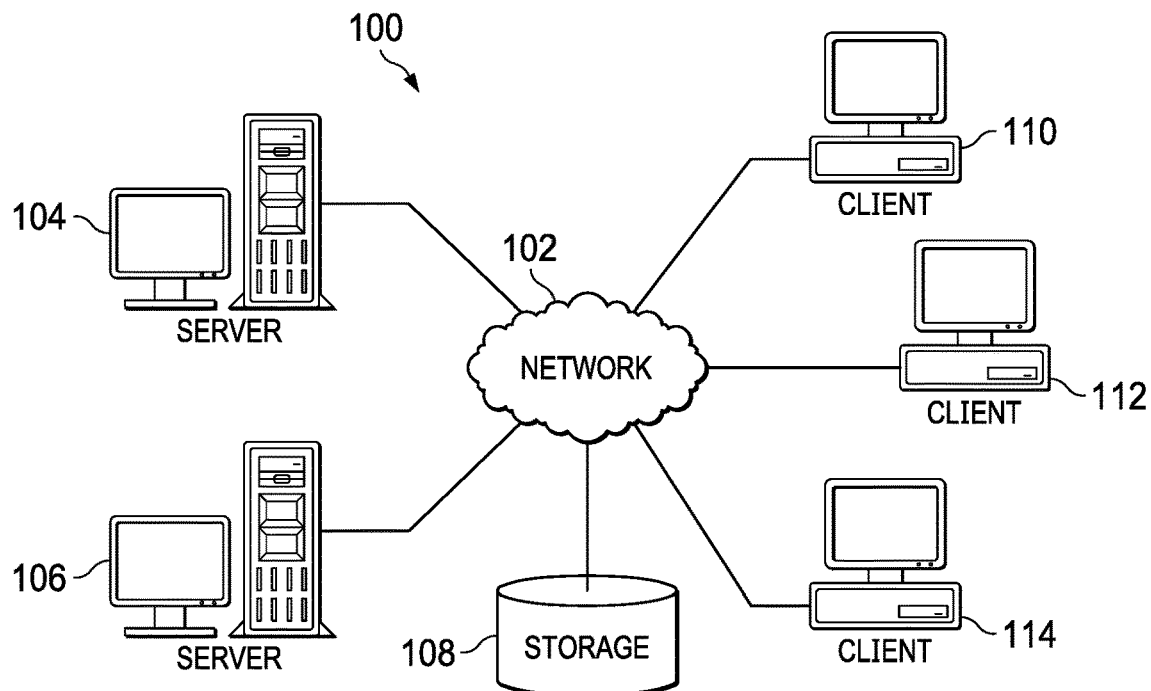
FIG. 1 depicts an exemplary block diagram of a distributed data processing environment in which exemplary aspects of the illustrative embodiments may be implemented.
Figure 2:
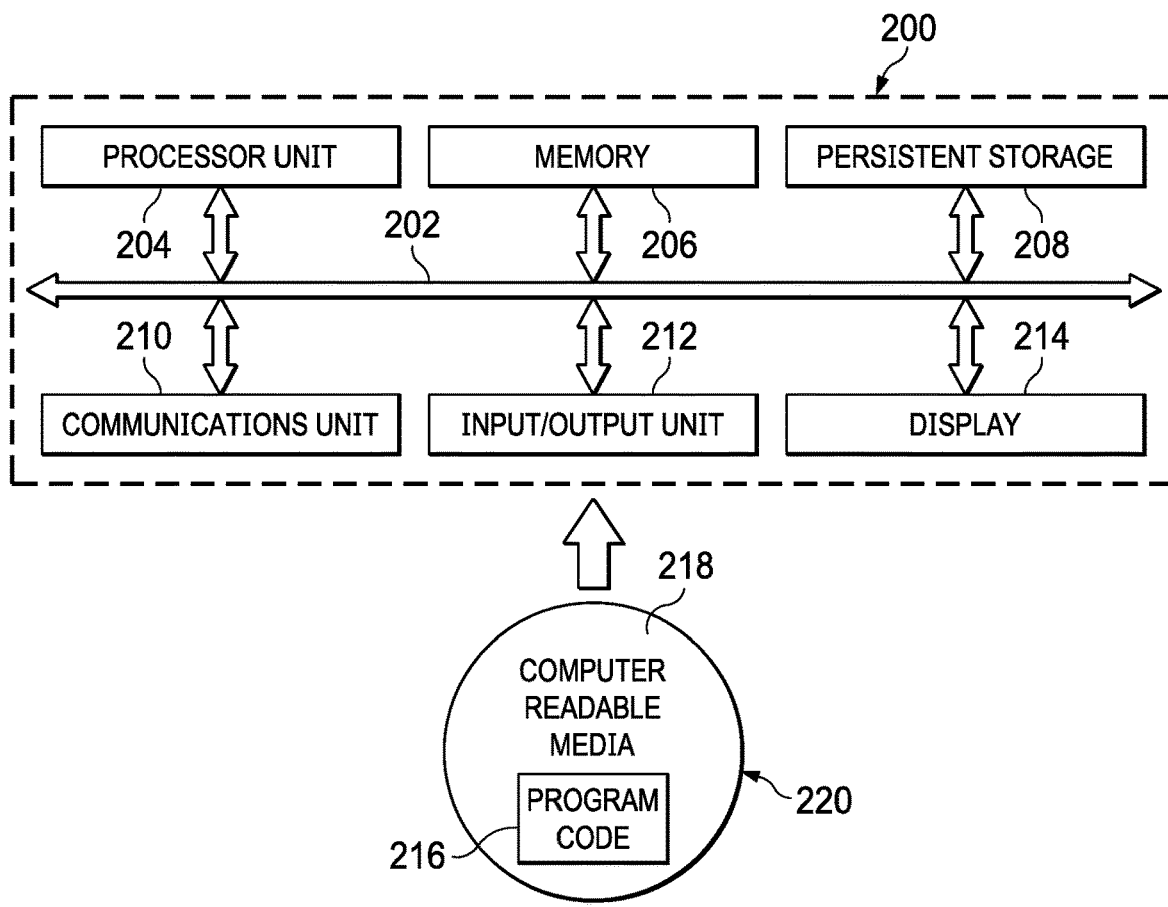
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the disclosed subject matter.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Internet of Things

The "Internet of Things" refers to the network of physical objects or "things" that are embedded with and/or otherwise include electronics, software, sensors, and Internet-accessible network connectivity that allow these objects to collect and exchange data. Due to the increase in physical devices with network connectivity capabilities, the IoT is growing rapidly. In the IoT, sensors/devices of many different types and capabilities are deployed for different purposes. These sensors/devices communicate using different protocols/methods, and they require correspondingly different interfaces to manage. These devices are manufactured by many different manufacturers and, as a consequence, have different and quite varied sets of operating characteristics. FIG. 2 is representative of computing device functionality that may be leveraged in an IoT device.

Figure 3:
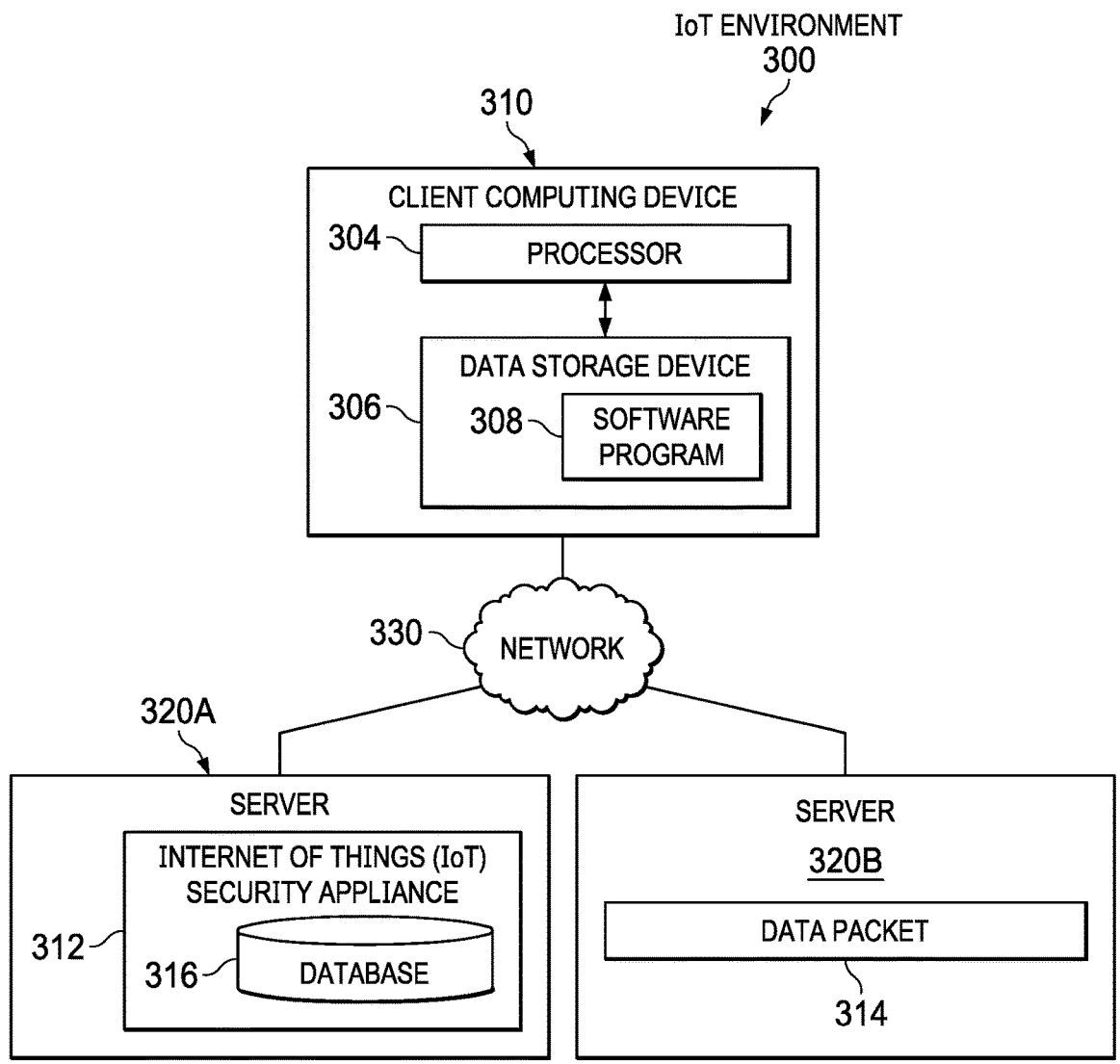
FIG. 3 illustrates a simplified IoT networking environment in which the techniques of this disclosure may be practiced.

Referring to FIG. 3, an exemplary IoT networked computer environment 300 is depicted, according to at least one embodiment. As in FIG. 1, the networked computer environment 100 includes a client computing device 310 and a server 320A, 320B interconnected via a communication network 330. According to at least one implementation, the networked computer environment 300 may include a plurality of client computing devices 310, only one of which is shown for illustrative brevity. The networked computer environment 300 may also include a plurality of servers 320A, 320B, only two of which are shown for illustrative brevity. The communication network 330 may include various types of communication networks, such as a wide area network (WAN), local area network (LAN), a telecommunication network, a wireless network, a public switched network and/or a satellite network. The communication network 330 may include connections, such as wire, wireless communication links, or fiber optic cables. Of course, it should be appreciated that FIG. 3 provides only an illustration of one implementation and does not imply any limitations with regard to the environments in which different embodiments may be implemented. Many modifications to the depicted environments may be made based on design and implementation requirements.

As was depicted in FIG. 2, the client computing device 310 includes a processor 304 and a data storage device 306 that is enabled to host and run a software program 308 and communicate with the server 320A, 320B via the communication network 330. In at least one embodiment, the client computing device 310 is an IoT device. Typically, an IoT device includes various components, such as a listener, a broadcaster, a recorder, and a sensing/actuation component. In general, the listener serves to receive data or other input via the communication network, while the broadcaster serves to broadcast data or other output via the network. The sensing/actuation component undertakes sensing and actuation functions conventionally associated with IOT devices. Generally, the sensing/actuation component may serve to undertake sensing or measurement of ambient parameters, such as temperature, brightness, sound, etc., as may be appropriate in the context of the device. The recorder serves to log data.

The server computer 320A, 320B may be a laptop computer, netbook computer, personal computer (PC), a desktop computer, or any programmable electronic device or any network of programmable electronic devices capable of hosting and running an IoT security appliance 312 and a data packet 314 and communicating with the client computing device 310 via the communication network 330. The server 320A, 320B may also operate in a cloud computing service model, such as Software as a Service (SaaS), Platform as a Service (PaaS), or Infrastructure as a Service (IaaS). The server 320A, 320B may also be located in a cloud computing deployment model, such as a private cloud, community cloud, public cloud, or hybrid cloud.

In a typical embodiment, the IoT security appliance 312 is a program capable of scanning an incoming data packet 314 through original signature-based and/or behavior-based patterns to detect data leaks. To this end, the IoT security appliance 312 may contain a data repository, such as database 316, to store existing IoT images, such as those received from a manufacturer, or those otherwise manually imported by a user.

Automated Individualized Network Flow Controls for IoT Devices

With the above as background, the technique of this disclosure are now described.

As noted above, the subject matter herein describes a method, apparatus and computer program product for protecting enterprise IT infrastructures by automatically instantiating individualized network flow controls and network access controls specific to an IoT device. According to this disclosure, when a network control system becomes aware of a new IoT device, the control system queries an authoritative rule source to identify the network flow control and access control rules for the device, which it then implements.

Figure 4:
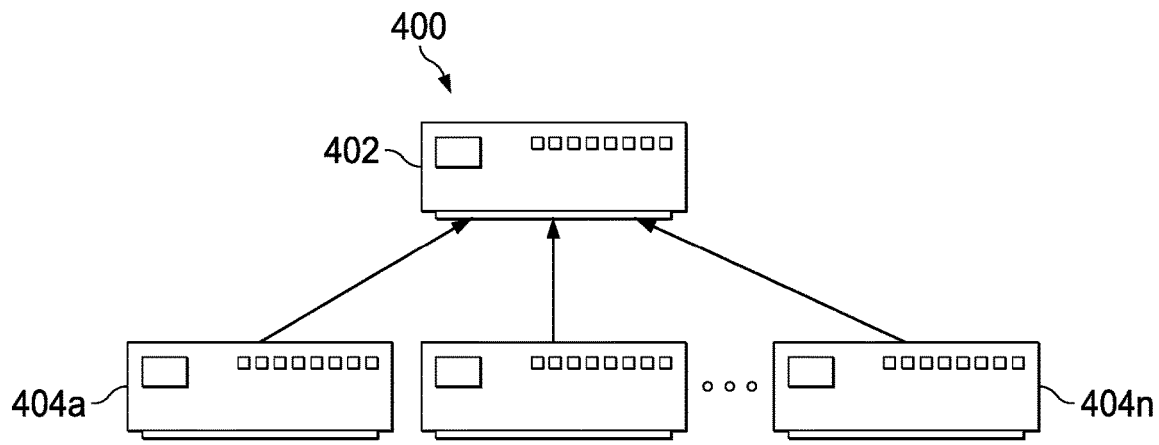
FIG. 4 depicts a representative implementation of an enterprise network flow control system in which techniques of this disclosure may be implemented.

In a preferred embodiment that is now described, the technique of this disclosure is carried out within or in association with a control component for a set of one or more network flow control devices (e.g., routers, gateways, etc.) in the enterprise. FIG. 4 depicts the basic architecture of a representative network control system 400 in which the technique may be practiced. In this example embodiment, which is not intended to be limiting, the network control system 400 comprises a central control component 402, and a set of network flow control devices 404a-n. As previously noted, typically the network flow control devices 404 are devices such as routers, switches, gateways, firewalls, and the like. A network control device for an enterprise is sometimes referred to herein as a network boundary control system (NBCS). Generalizing, a network control device of this type facilitates the egress of data packets from the network 400, as well their ingress into the network, typically with respect to a security policy that is enforced at the network control device. Other NBCS types in which the techniques may be practiced in whole or in part include: a proxy, an Intrusion Protection System (IPS) or Intrusion Detection System (IDS), an antivirus system, or some other such device, program, process, or functionality. The particular type of network flow control device 404 is not intended to be limiting. The network control system's control component 402 provides a control layer for provisioning, managing and controlling the individual network flow control devices. Collectively, the control component 402 and the network flow control devices 404 provide for a distributed, secure network that facilitates implementation of enterprise security policy. In a representative but non-limiting embodiment, the control component 402 is implemented as a In a representative but non-limiting embodiment, the control component 402 is associated with or comprises a component within a Security Information and Event Management (STEM) enterprise solution. STEM tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some STEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. An enterprise solution of this type may be implemented using the client-server technologies described above, and as one or more computing entities such as depicted in FIG. 2.

Figure 5:
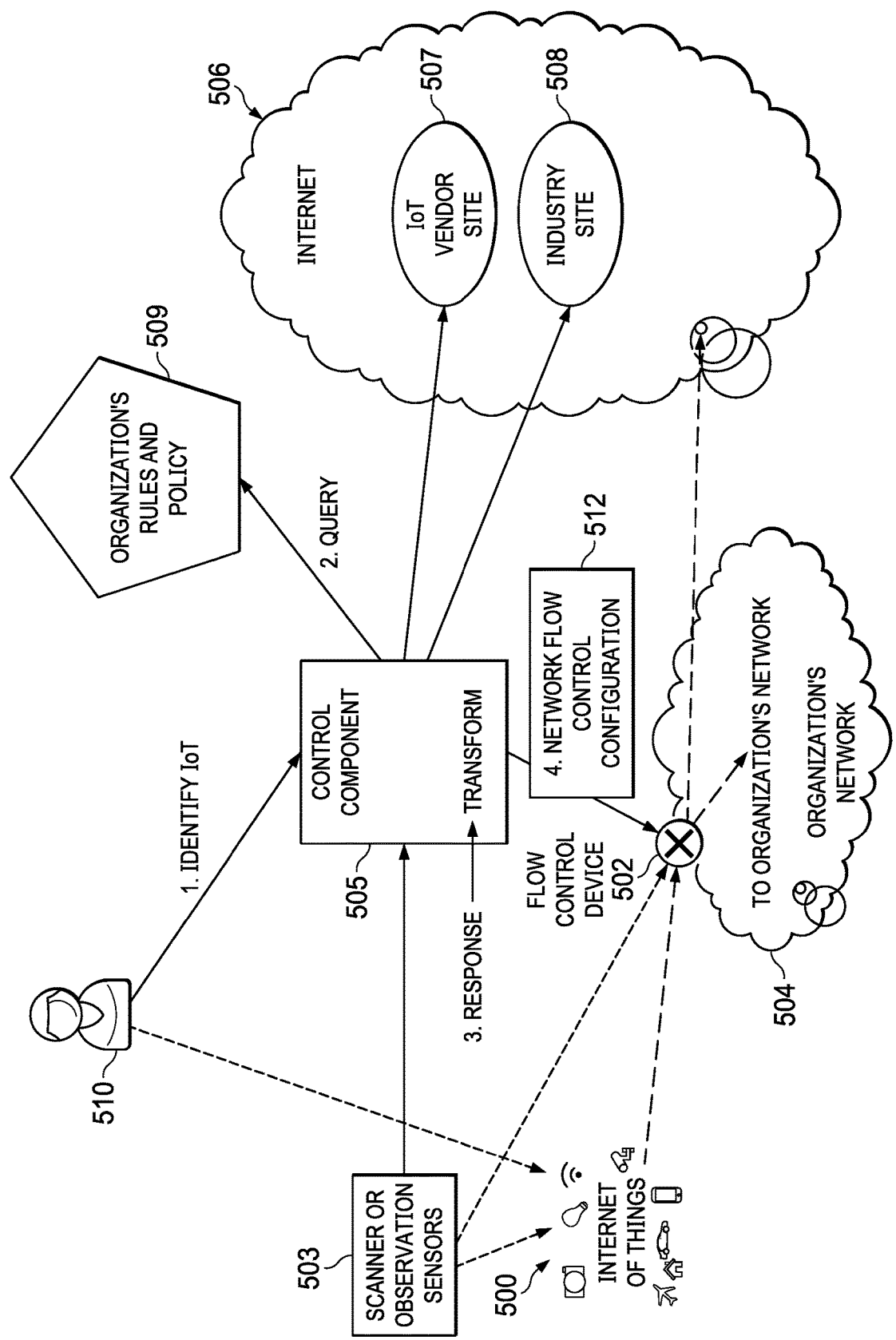
FIG. 5 depicts a preferred technique for implementing automated individualized network security controls for IoT devices and that are derived from authoritative sources according to this disclosure.

Referring now to FIG. 5, the technique of this disclosure is now described in the context of a typical enterprise security scenario. The enterprise in this context has an IoT comprising a set of devices 500, one or more network flow control devices (one of which is depicted at 502), a network scanner or set of one or more observation sensors 503, and the organization's network, which is represented generally at 504. A network administrator 510 is responsible for managing the network. As noted above, according to this disclosure there are a set of "authoritative" sources of information about the network flow control rules and/or access control rules that are applicable to one or more of the IoT devices 500. In this example embodiment, these authoritative sources comprise an IoT vendor website 507 or industry website 508 located on the publicly-routed Internet 506, as well as an enterprise (internal) site or data source 509. The enterprise data source 509 may obtain its information in whole or in part from the vendor or industry website(s), e.g., via an application programming interface or other automated request-response mechanism. Typically, the network flow control and access control rules are stored in a database in any convenient manner, e.g., as an XML configuration file.

The IoT information utilized by the configuration system of this disclosure typically comprises "flow attributes" associated with a particular IoT device and that, as noted above, is sourced from the manufacturer, the manufacturer's representative or other proxy. These flow attributes represent a set of network characteristics that the manufacturer (or some other entity), for example, considers to represent "normal" behavior of the IoT device. The set of network characteristics of course will vary based on the type and purpose of the IoT device. Representative network characteristics include, without limitation: whether or not the device sends/receives data using encryption, whether or not the device performs clear-text Data Loss Prevention (DLP) checks, the nature of the device's bandwidth requirements and anticipated use, anticipated communication frequency, anticipated communication volume, information associated with the device's recommended network address and port assignments, information associated with the protocol(s) utilized by the device, other specific device capabilities (e.g., processing time, memory requirements, etc.), device capability types, generic device capability and use, and so forth.

As also shown in FIG. 5, and according to this disclosure, the one or more network flow control devices 502 are managed/controlled by a control component 505 that implements an automated technique for instantiating individualized network security controls for each of one or more IoT devices, with such controls being derived from these authoritative data sources. Typically, the control component comprises one or more computing machines (physical or virtual), one or more control applications, programs, processes, utilities or execution threads, and associated data structures, etc., for purposes of implementing the technique that is now described. The network flow control device is an NBCS, e.g., a router, a gateway, etc., as previously described.

In particular, in a typical implementation scenario, an IoT device 500 is identified (step (1)), e.g., via network scanning or other observational sensors 503 that detect a new IoT device on the network (or some identifiable portion thereof) 504, or by receipt of information from the network administrator 510 that the device has been installed. Other known techniques, such as operating system (OS) fingerprinting, active probing (e.g., observing open ports on the device using an NMAP tool), or the like, may be used to detect the IoT device. Thus, depending on the implementation, information used to detect the IoT device may be pushed to the control component, the control component may selectively query other devices and systems to gather or otherwise obtain it, or other known data gathering techniques may be used. In response to receiving information about the new IoT device, the control component 505 executes a query (step (2)) to one or more of the authoritative data sources 507, 508 and/or 509, and receives a response (step (3)). In this manner, obtains from the one or more authoritative data sources 507, 508 and 509 the applicable network flow control and/or access control rules for the IoT device. As noted above, these sources are trusted by the control component 505 to provide network security and/or access control(s) for the IoT device that is installed or being installed into the enterprise network. In this manner, and typically using this query-response operation, the applicable network flow control rules and/or access control rules are obtained. The network flow control rules themselves may include the access control rules. The control component 505 has an associated database or other data storage in which the information obtained from the authoritative data sources is then cached.

Further, typically the control component 505 then processes the received rules, typically by translating those rules into a set of one or more configuration parameters that are consumable by the particular network flow control device that is (or will be) associated with the IoT device. As depicted in FIG. 5, these configuration parameters comprise a configuration 512 for the particular network flow control device 502. Using the configuration 512 provided by the control component 505, at step (4) the network flow control device 502 is then automatically configured in an "individualized" manner with the security controls that are appropriate or necessary to enable the network flow control device 502 to monitor, manage and control the IoT device. The particular configuration 512 of course will vary depending on the nature and type of network control flow device 502. Preferably, a configuration 512 is cached for re-use when necessary for other similar network flow control devices. In this manner, the control component builds a library of configurations 512.

Thereafter, the network flow control device 502 that has been instantiated with the individualized configuration 512 monitors communications to and from the IoT device against the network flow control and/or access control rules, and it can then act to protect the enterprise IT infrastructure using that rule base. If and when a particular network flow control or access control rule is triggered (e.g., violated), the network control device 502 then takes one or more configured or predefined action(s) (e.g., issuing a notification or alert, blocking access to the network, etc.). In this manner, the IoT device is prevented from being infected with malware, can no longer be used by hackers to gain access to the network 504, and can no longer be used as a vector to attack other enterprise systems.

The particular nature of how the network flow control device acts once an applicable rule is triggered is not necessarily an aspect of this disclosure, as that action typically will be implementation-specific. The warning or block may be implemented one-time, continuously, on a communication flow-basis, for a particular session, or according to some other constraint or security policy. The particular action taken also may vary depending on one or more factors, such as the nature of the anomaly, a time-of-day, a source or target of the communication flow to/from the IoT device, and the like.

The nature of the "processing" performed by the control component to translate the rules received from the authoritative source(s) into the configuration 512 also is implementation-specific. Typically, that translation will involve normalization, filtering, data deduplication, and the like. The processing may also include adding a data security layer (e.g., encryption) or the like so that the configuration itself is secured from compromise. The authoritative data sources as used herein may leverage other systems, such as general purpose network flow characterization systems, IoT naming systems, and known systems for automatically constructing rules that interpret information from IoT devices. These known systems provide techniques for rules automation, and automated scripting.

In accordance with the approach herein, typically the initial identity representation of the IoT device and that is used by the organization's network flow control devices is the Internet Protocol (IP) address assigned to the device. As depicted in FIG. 5, step (1), the identification of the IoT device may be explicit, such as may arise when the network operator assigns an IP address to the device, or IoT devices are defined by the network architecture to be within a specific range of addresses. Alternatively, and to facilitate a fully-automated solution, the identification of the IoT device is implicit, such as by observing communication flow behaviors on the network, correlating to an IoT device, and then associating that specific IoT device with the observed IP address of the device. In the latter case, some examples of attributes of the network communication flows that may be observed and then used to facilitate the implicit identification of the IoT device include, without limitation: transport protocol (e.g., UDP, TCP, etc.), session protocol (e.g., FTP, SFTP, HTTP, etc.), anticipated message sequence (e.g., IoT device sends 2 TCP messages, receives 3, sends 2, receives 1, . . . , etc.), each message's attributes (e.g., message 1 from/to address, from/to port number, message size, message checksum, message 2, . . . , etc.), message rate, message time-of-day, message header description, message payload description (e.g., first 16 bytes is the device's unique identifier, . . . , etc.), MAC addresses (as MAC addresses are assigned to specific manufacturers, which in turn may be identified as an IoT manufacture), etc. Once it has obtained the observed flow information, the control component uses it (or some portion thereof) to attempt to identify the IoT device. Typically, this identification is carried out by correlating the observed information (or portion thereof) to some general set of information about the types of IoT device(s) that are or may be used in the enterprise. By correlating the observed data with the general information, the control component determines the identity of the IoT device, and then associates the device with an IP address. This indirect method of determining the identity of the IoT device may be supplemented or augmented with other knowledge sources.

The following provides additional details regarding FIG. 5 step (2), namely, the query and response mechanism by which the control component then obtains the applicable network flow control and/or access control rules for the IoT device from the one or more authoritative data sources. In this operation, the control component queries the one or more sources, e.g., via web services, an API, an HTTP/S request-response mechanism, or the like. As noted above, the information repository that stores the network control flow and/or access control rules may be vendor-specific, industry-specific, or even provided by the enterprise or some other trusted source (e.g., companies providing networking equipment or IT security controls, companies that provide IT security governance and oversight, companies providing security services, and the like). This operation returns the network flow control and/or access control rules that are pertinent to the specific IoT device.

The following provides an example of FIG. 5, step (3), in which the network flow control rules obtained from the authoritative source are then converted (in whole or in pertinent part) into a set of one or more configuration change(s) that are then consumed by the specific network equipment vendor's IoT device in question. Of course, the particular nature, syntax and details of the configuration changes that are necessary to instantiate the particular network security controls for the particular IoT device of course will vary depending on the IoT device, where it is configured, the enterprise network's own configuration (including identity and location of resources), applicable security policy, and so forth.

To provide a concrete example, assume that the control component identifies (e.g., through step (2)) IoT device "1" that is operating at the enterprise IP address: a.b.c.d. Given the IoT device and its enterprise network location, the control component then generates the applicable configuration 512, perhaps as: "allow device with IP address a.b.c.d to initiate TCP connection outbound on port 2525 to . . . //enterprise.com/iot/analytics, receive, from . . . //enterprise.com/IoT/update, TCP connection inbound within two (2) minutes after having sent a TCP connection to port 2525 to . . . //enterprise.com/IoT/analytics, send outbound no more than 1 KBytes per second, receive inbound no more than 10 Kbytes/sec, receive UDP connections from . . . //enterprise.com/IoT only from 7 pm to 11 pm, received UDP packets must contain first 16 bytes as "A14BCD444EF0B22A." As will be appreciated, the above-described "configuration" thus is individualized (i.e., customized) for the specific IoT device, typically based on the device's type and location, an enterprise security policy, as well as one or more other typically enterprise-specific attributes, constraints or other factors.

The above-identified example configuration is merely representative.

The approach as described above provides significant advantages. It enables robust and fine-grained management and control over IoT devices based on the identity of those devices and how they are configured into the enterprise network. Once the IoT device is identified, the control component obtains applicable network flow control and/or access control rules for that device. The control component then translates those rules into a set of one or more configuration parameters that are consumable by the particular network flow control device that is (or will be) associated with the IoT device. Because the control component is enterprise network-aware, the particular configuration that is creates for the IoT device is customized for that device. The control component then instantiates the configuration into the enterprise's network flow control device that is responsible for communications to and from the IoT device. Thereafter, the network flow control device monitors communications to and from the IoT device against the configuration so as to manage the IoT device, e.g., by identifying and responding to anomalous behaviors that may be indicative of IoT device attack or compromise.

As noted above, it is not required that the network flow control device be any specific type of network boundary control system, or that it be implemented in association with a particular NBCS.

The technique described herein (e.g., obtaining network flow control and/or access control rules, creating customized device configurations, etc.) may be implemented in whole or in part as-a-service. Further, the subject matter may be implemented within or in association with a data center that provides cloud-based computing, data storage or related services.

As noted above, the approach herein is designed to be implemented in an automated manner within or in association with a network control system, or any other type of security system, such as a SIEM.

Figure 6:
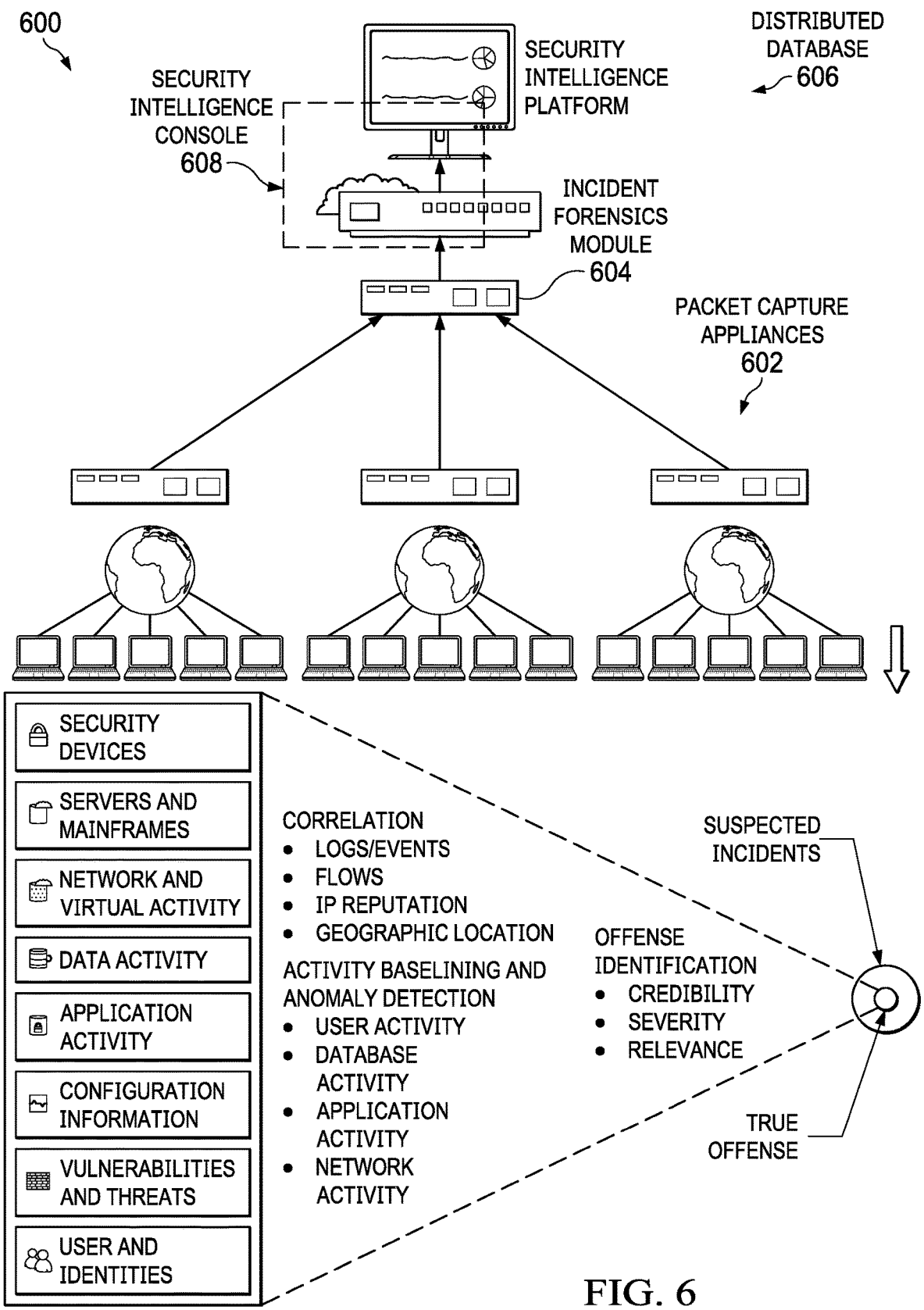
FIG. 6 depicts an enterprise security platform that may be used in association with the described technique.

As also previously mentioned, the control component may comprise part of a security intelligence platform solution. Known platforms of this type provide for search-driven data exploration, session reconstruction, and forensics intelligence to assist security incident investigations. A representative platform of this type is depicted in FIG. 6 and comprises a set of packet capture appliances 602, an incident forensics module appliance 604, a distributed database 606, and a security intelligence console 608. The packet capture and module appliances are configured as network appliances, or they may be configured as virtual appliances. The packet capture appliances 602 are operative to capture packets off the network (using known packet capture (pcap) application programming interfaces (APIs) or other known techniques), and to provide such data (e.g., real-time log event and network flow) to the distributed database 606, where the data is stored and available for analysis by the forensics module 604 and the security intelligence console 608. A packet capture appliance operates in a session-oriented manner, capturing all packets in a flow, and indexing metadata and payloads to enable fast search-driven data exploration. The database 606 provides a forensics repository, which distributed and heterogeneous data sets comprising the information collected by the packet capture appliances. The console 608 provides a web- or cloud-accessible user interface (UI) that exposes a "Forensics" dashboard tab to facilitate an incident investigation workflow by an investigator. Using the dashboard, an investigator selects a security incident. The incident forensics module 604 retrieves all the packets (including metadata, payloads, etc.) for a selected security incident and reconstructs the session for analysis.

A representative commercial product that implements a workflow of this type is IBM® Security QRadar® Incident Forensics V7.2.3 (or higher).

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. Typically, it is designed to be a sealed and secure environment with limited accessibility and then only be authenticated and authorized individuals.

An appliance of the type described above can facilitate Security Information Event Management (STEM). For example, IBM® Security QRadar® STEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar STEM installation, the system such as shown in FIG. 6 is configured to collect event and flow data, and generate reports. A user (e.g., an SOC analyst) can investigate offenses to determine the root cause of a network issue.

The scheme described herein may be implemented in or in conjunction with various server-side architectures including simple n-tier architectures, web portals, federated systems, and the like. The techniques herein may be practiced in a loosely-coupled server (including a "cloud"-based) environment.

As a variant, the particular IoT device configuration is generated by or on behalf of the enterprise, but then those rules are instantiated by a server provider, such as a cloud-based service provider. The following provides a brief summary of the characteristics of this type of services environment.

In particular, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "NIST SP800-145 The NIST Definition of Cloud Computing" by Peter Mell and Tim Grance, dated September, 2011.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

A typical but non-limiting implementation of the technique herein is as a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques herein are implemented in whole or in part in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., network security systems.

The particular IoT devices that are monitored according to the techniques herein are not limited. Any IoT device as currently configured or that may be provided in the future may take advantage of the described techniques.

The nomenclature of a set of "flow attributes" for an IoT device should not be taken by way of limitation either. The attributes may be implemented as a model, a set of data, a data structure, a linked set of data points, or the like, with or without temporal association. For additional security, the data set may be further processed (e.g., by hashing or the like) to protect the information details.

The reference herein to "control rules" as comprising network flow control rules, and access control rules, also is not intended to be limited. Some IoT devices may only require access to the Internet and not to any other device on the network other than devices that route to the Internet. This may be determined by monitoring, e.g., if a device goes for a given number of hours after initial connection without any communication other than out to the Internet, the device may be manually or automatically locked into an "Internet-access-only" mode such that, if the device is later compromised, it may not be used to attack the rest of the network. For devices of this type, the control rules may be embodied by other types of controls, such as enabling Private VLAN controls for the IoT device performed at an Ethernet switch (or the like), so that only the router is reachable, possibly with additional router rules that only allow access to the Internet and not to anywhere else in the enterprise. Another alternative is to implement access point (AP) isolation controls for the IoT device, possibly with additional router rules that only allow access to the Internet. These scenarios are merely representative, and they should not be taken by way of limitation. Thus, the set of "control rules" may be intended to control the IoT device directly or indirectly.

Having described the invention, what we claim is as follows:

1. An apparatus to protect an enterprise network that includes a set of one or more network control devices, comprising:
   a processor;
   computer memory holding computer program instructions executed by the processor, the computer program instructions configured in an automated manner to:
      detect a new Internet of Things (IoT) device by observing one or more attributes associated with a communication flow behavior in the enterprise network;
      responsive to detecting the new IoT device, associate the new IoT device with an observed Internet Protocol (IP) address in the enterprise network and query an authoritative source to obtain a set of control rules for the new IoT device, the set of control rules representing a normal behavior of the new IoT device as specified by a provider of the new IoT device;
      responsive to receipt of the set of control rules from the authoritative source, generate a device configuration comprising a set of one or more configuration parameters for use by a network control device of the set to control network behavior of the new IoT device, the set of configuration parameters being individualized for the new IoT device and based at least in part on the set of control rules and a location of the new IoT device in the enterprise network associated with the observed IP address; and
      instantiate the device configuration into the network control device to control network behavior of the new IoT device.

2. The apparatus as described in claim 1 wherein the authoritative source is one of: a vendor of the new IoT device, and a trusted third party source that manages control rules on behalf of vendors of IoT devices.

3. The apparatus as described in claim 1 wherein the computer program instructions configured to detect the new IoT device include program code to receive information that identifies the new IoT device directly.

4. The apparatus as described in claim 1 wherein the computer program instructions configured to detect the new IoT device include program code to observe a message sequence of the communication flow behavior associated the new IoT device, to correlate the observed communication flow behavior in whole or in part with known behaviors for a set of IoT devices, and to identify the new IoT device indirectly based at least in part on the correlation.

5. The apparatus as described in claim 1 wherein the set of configuration parameters are also based at least in part on information derived from the enterprise network.

6. The apparatus as described in claim 5 wherein at least one configuration parameter is a configuration change that is based on the information derived from the enterprise network.

7. The apparatus as described in claim 1 wherein the computer program instructions are further configured to control the at least one of the network control devices to monitor network behavior of the new IoT device against the device configuration.

8. The apparatus as described in claim 1 wherein the set of control rules comprise one of: network flow control rules, and access control rules.

9. A computer program product in a non-transitory computer readable medium for use in a data processing system to protect an enterprise network that includes a set of one or more network control devices, the computer program product holding computer program instructions that, when executed by the data processing system, are configured in an automated manner to:

detect a new Internet of Things (IoT) device by observing one or more attributes associated with a communication flow behavior in the enterprise network;

responsive to detecting the new IoT device, associating the new IoT device with an observed Internet Protocol (IP) address in the enterprise network and querying an authoritative source to obtain a set of control rules for the new IoT device, the set of control rules representing a normal behavior of the new IoT device as specified by a provider of the new IoT device;

responsive to receipt of the set of control rules from the authoritative source, generating a device configuration comprising a set of one or more configuration parameters for use by a network control device of the set to control network behavior of the new IoT device, the set of configuration parameters being individualized for the new IoT device and based at least in part on the set of control rules and a location of the new IoT device in the enterprise network associated with the observed IP address; and instantiating the device configuration into the network control device to control network behavior of the new IoT device.

10. The computer program product as described in claim 9 wherein the authoritative source is one of: a vendor of the new IoT device, and a trusted third party source that manages control rules on behalf of vendors of IoT devices.

11. The computer program product as described in claim 9 wherein the computer program instructions configured to detect the new IoT device include program code to receive information that identifies the new IoT device directly.

12. The computer program product as described in claim 9 wherein the computer program instructions configured to detect the new IoT device include program code to observe a message sequence of the communication flow behavior associated the new IoT device, to correlate the observed communication flow behavior in whole or in part with known behaviors for a set of IoT devices, and to identify the new IoT device indirectly based at least in part on the correlation.

13. The computer program product as described in claim 9 wherein the set of configuration parameters are also based at least in part on information derived from the enterprise network.

14. The computer program product as described in claim 13 wherein at least one configuration parameter is a configuration change that is based on the information derived from the enterprise network.

15. The computer program product as described in claim 9 wherein the computer program instructions are further configured to control the at least one of the network control devices to monitor network behavior of the new IoT device against the device configuration.

16. The computer program product as described in claim 9 wherein the set of control rules comprise one of: network flow control rules, and access control rules.

* * * * *